March 24, 1953  J. MIHALYI  2,632,357
COMBINED RANGE AND VIEW FINDER
Filed Sept. 1, 1950  3 Sheets-Sheet 1
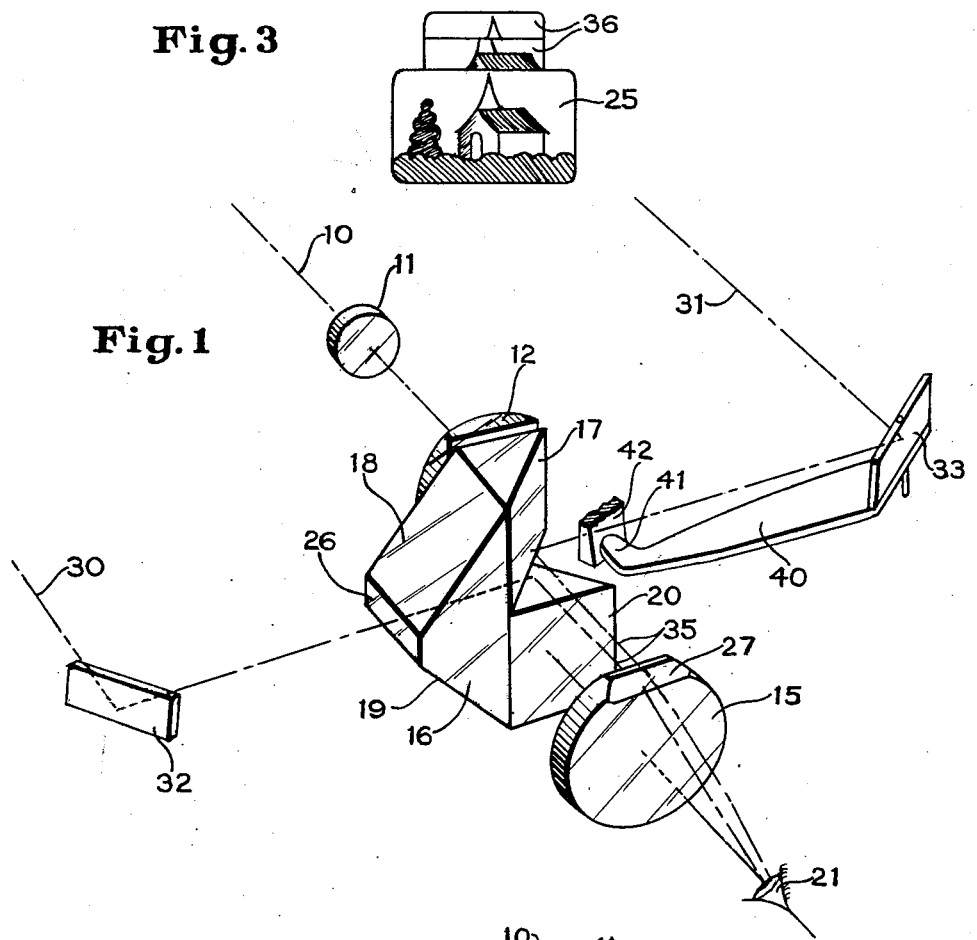
Joseph Mihalyi
Inventor
By Daniel I. Mayne
F. M. Emerson Holmes
Attorneys March 24, 1953   J. MIHALYI   2,632,357
COMBINED RANGE AND VIEW FINDER
Filed Sept. 1, 1950

Joseph Mihalyi
Inventor

March 24, 1953     J. MIHALYI     2,632,357
COMBINED RANGE AND VIEW FINDER
Filed Sept. 1, 1950     3 Sheets-Sheet 3

Joseph Mihalyi
Inventor

By Daniel J. Mayne
F. M. Emerson Holmes
Attorneys

Patented Mar. 24, 1953

2,632,357

UNITED STATES PATENT OFFICE 2,632,357

COMBINED RANGE AND VIEW FINDER

Joseph Mihalyi, Rochester, N. Y., assignor to Eastman Kodak Company, Rochester, N. Y., a corporation of New Jersey Application September 1, 1950, Serial No. 182,723

7 Claims. (Cl. 88—2.7)

This invention relates to combined range and view finders, particularly for use on photographic cameras.

The object of the invention is to provide an extremely simple but accurate and precise optical system for combined view and range finding.

It is an object of a preferred embodiment of the invention to have the view finder system and the eyepiece arranged so that the respective fields may be viewed without changing the position of the eye of the observer.

Certain forms of view finders, sometimes termed orthoscopic view finders, involve a terrestrial telescope system and an erector prism. Such view finders have many inherent advantages. Various types of erector prisms may be used with such systems. A specific object of the present invention is to provide a range finder of extremely simple construction which utilizes the erector prism which is already present anyway as part of the orthoscopic view finder. The commonest forms of erector prisms, and the present invention uses one of these forms, consist essentially of four plane reflecting surfaces; mirrors may be substituted for the prisms. The present invention conveniently uses two of these reflecting surfaces (mirrors or prisms) as the beam combining surfaces of a range finder.

According to the invention a combined range finder view finder optical system is made up of a view finder objective for forming a real image of an object, with or without a field lens at this real image and an eyepiece optically aligned for viewing the image. An erector system of prisms or mirrors is optically aligned between the objective and the eyepiece and consists of four reflecting surfaces, one for receiving light from the objective and reflecting it at right angles, the second and third for reflecting the light twice more at right angles and at right angles to the objective axis and the fourth for finally reflecting the light to the eyepiece. The second and third reflecting surfaces are conveniently in the form of a porro prism with the dihedral edge formed by the reflecting surfaces beveled to admit one of the range finder beams so that it is reflected by the fourth reflecting surface parallel to the optic axis of the objective and eyepiece and juxtaposed to the other range finder beam as reflected by the back of the first reflecting surface. Thus the two range finder beams are parallel and adjacent to the view finder beam as it travels toward the eyepiece.

In a preferred embodiment of the invention, no lenses are included in the range finder beams and the part of the eyepiece which transmits the range finder beams has no focal power so that the beams are always erect and at unit magnification. Preferably this part of the eyepiece which transmits the range finder beams, is wedged so as to deviate the beams to the eye of the observer when the eye is located on the optic axis of the eyepiece.

The invention is applicable to fixed range finders, i. e. those which merely indicate when an object is at some predetermined distance, or to the more usual type of range finders provided with light deviating means. Any standard form of light deviating means may be used. Similarly the range finder reflectors at the range finder viewing points may be plane mirrors or penta prisms. It should be observed however that the cost of the combined system is merely that of the view finder system alone plus the two viewing point mirrors and the light deviating adjustment mechanism. The beveling of the dihedral edge of the porro prism and the wedging of one edge of the eyepiece may or may not add to the cost of the view finder since these modifications may be provided as the elements in question are originally molded. Other objects and advantages will be apparent from the following description when read in connection with the accompanying drawings in which:

Fig. 1 is a perspective view of an optical system according to the preferred embodiment of the invention;

Fig. 2 is a plan view of this embodiment;

Fig. 3 represents the field of view as seen in the embodiment shown in Fig. 1;

Figure 4:
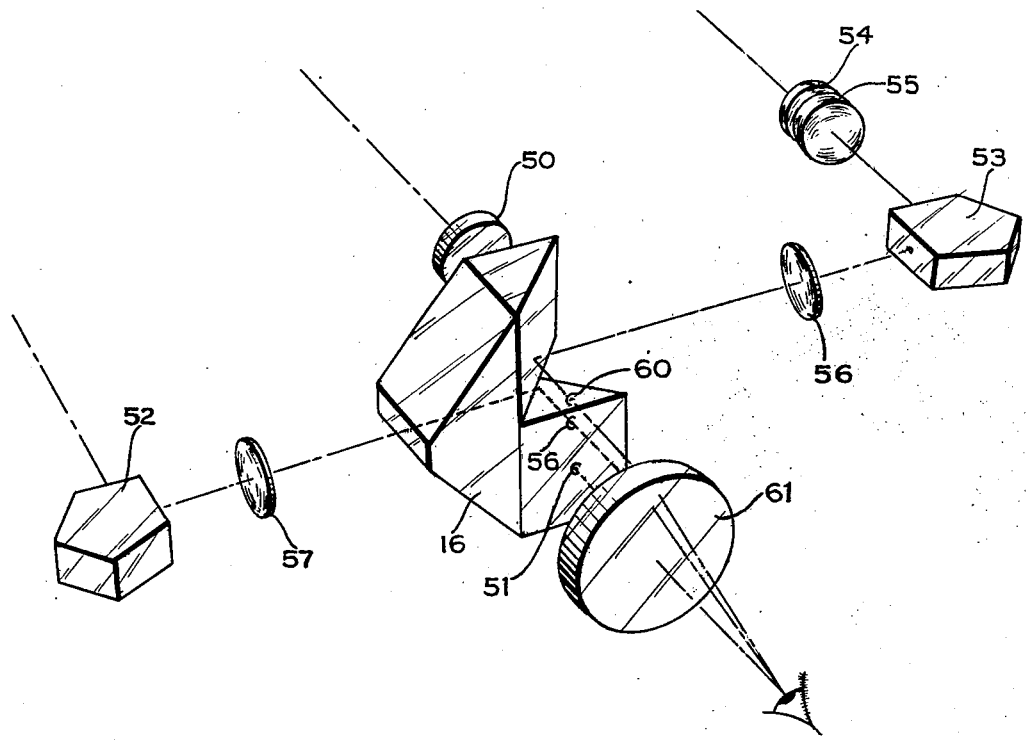
Fig. 4 shows an embodiment similar to Fig. 1 but with several features modified.

In Fig. 1 light from an object represented by a ray 10 is focused by a view finder objective 11 to form a real image of the object in a field lens 12. This image is viewed by an eyepiece 15 through an erector prism system 16 consisting of a right angle portion 17 which receives light from the objective 11, reflects it at right angles to the axis 10 toward a porro prism portion of the erector system. The light is then reflected at the surface 18 and then at the surface 19 back toward the vertical plane through the axis 10. It is then reflected by the right angle prism portion 20 parallel to the axis 10 and toward the eyepiece 15, eventually reaching the eye 21 of an observer. The erect image of the object as seen in the eyepiece 15 is shown at 25 in Fig. 3. This view finder system constitutes a simple orthoscopic system. It is modified, for range finder purposes discussed below, only in two ways. First the dihedral edge between the reflecting surfaces 18 and 19 is beveled to form a surface 26 orthogonal to one of the range finder beams. Secondly one edge 27 of the eyepiece 15 has no focusing power but is wedged to deviate two range finder beams toward the axis of the eyepiece and to the eye 21 of the observer. Range finder beams 30 and 31 coming from the object are reflected by plane front surface mirrors 32 and 33. The beam from the mirror 32 passes orthogonally through the entrance face 26 and is reflected along with the view finder beam by the right angle prism 20. The range finder beam from the other mirror 33 is reflected from the back of the surface 17, which preferably is provided with a metallic coating, juxtaposed with respect to the first mentioned range finder beam. These two beams 35 then pass through the wedged portion 27 of the eyepiece and are deflected as discussed above. The beams appear erect as shown at 36 in Fig. 3 (since there is no lens or inverting prism anywhere in the range finder system), and at unit magnification. In this particular system the view finder beam is also at unit magnification simply by having the objective 11 and the eyepiece 15 of equal power, but this is not an essential part of the invention and in general the view finder image has much smaller magnification than the range finder image.

The range finder may be a fixed one or may be provided with any of the standard light deviating means. For example the mirror 33 is rotatable about a vertical axis by means of a lever 40 and cam follower 41 which engages a cam surface 42 shown broken away, which cam surface is adjusted by focusing the lens of a camera, for example, in any of the usual ways. It is repeated that the particular light deviating mechanism of the range finder is not an essential feature of the invention which rather is directed toward the simplified manner in which a range finder is added to an orthoscopic view finder utilizing the first and fourth reflecting surfaces of an erector prism as crossed reflectors for combining the range finder beams.

Figure 5:
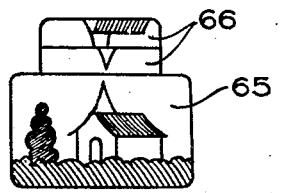
Fig. 5 shows the field of view through the embodiment shown in Fig. 4.

In Fig. 4 the view finder objective 50 is somewhat nearer the erector prism 16 and forms the view finder image on the exit face, i. e. at the point 51 of the erector prism. The viewing point reflectors of the range finder system are, in this case, penta prisms 52 and 53. Ranging is accomplished by the rotation in opposite directions about the optic axis, of two wedges 54 and 55. Rotating wedge systems are well known and the form thereof is not critical with respect to the present invention. The range finder beams are respectively focused by lenses 57 and 58 to form images at the points 59 and 60 in the same plane as the view finder image at the point 51. All three images may thus be viewed simultaneously by a simple eyepiece 61. As before, the view finder field 65, as shown in Fig. 5, is erect but the range finder fields 66 are inverted since they do involve real images but do not encounter any erector prisms or the equivalent.

Figure 6:
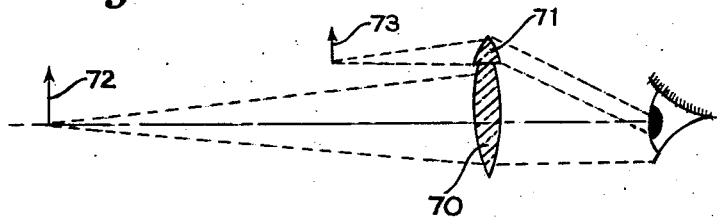
Fig. 6 illustrates an eyepiece which may be substituted for that of Fig. 4 when the range finder images are in a different plane from the view finder image.

In optical systems of the type shown in Fig. 4, it is sometimes desirable to have the view finder image in a plane different from that of a range finder image. In this case it is necessary to replace the eyepiece 61 by a bi-focal eyepiece such as shown in Fig. 6 consisting of two parts 70 and 71, respectively for viewing images 72 and 73 at different distances from the eyepiece. The section 71 can be considered the equivalent of a wedge as well as an eyepiece, so that it collimates the light from the image 73 and simultaneously deviates it toward the optic axis of the main portion 70 of the eyepiece.

Figure 7:
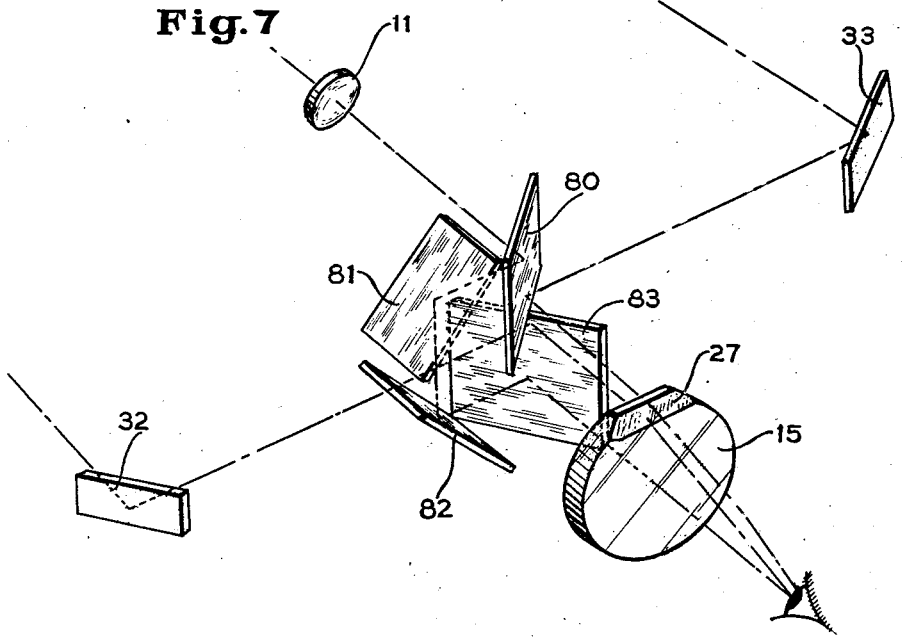
Fig. 7 is similar to Fig. 1 with the plane reflecting surfaces formed as mirrors rather than on prisms.

In Fig. 7 the arrangement is identical to that shown in Fig. 1 except that the field lens has been omitted and the erecting prism is replaced by simple mirrors 80, 81, 82 and 83. The space between the mirrors 81 and 82 corresponds to the beveled dihedral edge of the porro prism of Fig. 1. The mirrors are preferably front surfaced ones with the rear surface of the mirror 80 also metallized to be reflecting, but second surface mirrors with reflection reducing coatings on their "first" surfaces may be used.

I claim:

1. An optical system for a combined view and range finder comprising a view finder objective for forming a real image of an object, an eyepiece aligned for viewing said image, an erector prism optically between the objective and the eyepiece consisting of a right angle portion for reflecting light from the objective at right angles to the axis of the objective, a porro portion for receiving this light and reflecting it twice at right angles to said axis, another right angle portion for receiving the light from the porro portion and for reflecting it to the eyepiece parallel to said axis, the reflecting surface of the first mentioned right angle portion being reflecting from both sides and the two right angle portions being in contact with each other, the plane of contact approximately bisecting the dihedral angle of the porro prism, range finder reflectors on opposite sides of the view finder system for receiving light from the object and for reflecting two beams toward the erector prism, one toward the back of the reflecting surface of the first mentioned prism portion and the other through an entrance face on said porro portion which entrance face is the dihedral edge of the porro reflecting surfaces beveled orthogonally to the incident range finder beam, the beam through said entrance face being reflected by said another right angle portion into juxtaposition with the first range finder beam as reflected from the back of the first mentioned prism portion, and means adjacent to said eyepiece for transmitting the juxtaposed range finder light beams.

2. An optical system according to claim 1 in which the range finder reflectors are plane mirrors and in which the range finder beams encounter only plane optical surfaces so that the fields of the two range finder beams are always erect and at unit magnification.

3. An optical system for a combined range finder and view finder comprising a positive view finder objective for forming a real image of an object, an eyepiece optically aligned for viewing said image, an erector prism optically aligned between the objective and the eyepiece and consisting of three portions, the first portion being a right angle portion aligned to receive light from the objective and to reflect it at right angles to the optic axis of the objective, the second portion being a porro portion aligned to receive the light from the first portion and to reflect it twice also at right angles to said axis and the third portion being a right angle portion aligned to receive light from the second portion and to reflect it to the eyepiece and parallel to said axis, the reflecting surface of the first mentioned right angle portion being reflecting from both sides and the two right angle portions being in contact with each other, the plane of contact approximately bisecting the dihedral angle of the porro prism, range finder reflectors on opposite sides of the view finder system oriented to reflect two beams of light from the object toward each other and toward the erector prism, to be reflected respectively by the third prism portion and by the back of the reflecting surface of the first prism portion into juxtaposition parallel to said axis, the dihedral edge formed by the reflecting surfaces of the porro portion being beveled orthogonal to the range finder beam incident thereon to admit said beam to said third prism portion and a zero focal power wedge section on said eyepiece for receiving the two juxtaposed range finder beams and for deflecting them toward the optic axis of the eyepiece.

4. An optical system according to claim 3 in which a field lens is axially aligned with the objective at the focal plane thereof and the erector prism is between the field lens and the eyepiece.

5. A combined range finder view finder optical system comprising a positive view finder objective with its axis herein termed horizontal, for forming a real image of an object, a first plane reflecting surface for receiving light from the objective and reflecting it horizontally at right angles to said axis, a second plane reflecting surface for then reflecting the light vertical, a third plane reflecting surface spaced from the second one for then reflecting the light horizontally back toward the vertical plane of said axis, a fourth plane reflecting surface for then reflecting the light parallel to said axis, an eyepiece for receiving said light and for viewing said image, the first reflecting surface being reflecting from both sides and the first and fourth reflecting surfaces being substantially in contact at a point in a horizontal plane lying between the second and third reflecting surfaces, range finder reflectors horizontally spaced on opposite sides of the view finder system for reflecting two beams of light from the object, one of them between the second and third reflectors to the front of the fourth reflecting surface and the other toward the back of the first reflecting surface whereby the two beams are reflected juxtapositioned and parallel to said axis, said eyepiece including means for transmitting the juxtaposed range finder beams at one side of the view finder beam.

6. An optical system according to claim 5 in which the range finder reflectors are plane mirrors and in which the range finder beams encounter only plane optical surfaces so that the fields of the two range finder beams are always erect and at unit magnification.

7. An optical system according to claim 6 in which the eyepiece includes, in alignment with the range finder beams, a zero focusing power wedged portion for deviating the range finder beams toward the optic axis of the eyepiece.

JOSEPH MIHALYI.

REFERENCES CITED

The following references are of record in the file of this patent:

UNITED STATES PATENTS

| Number | Name | Date |
|---|---|---|
| Re. 17,995 | Mitchell | Mar. 10, 1931 |
| 2,153,193 | Mihalyi | Apr. 4, 1939 |
| 2,172,339 | Mihalyi | Sept. 5, 1939 |
| 2,284,562 | Dittmann | May 26, 1942 |
| 2,313,567 | Mihalyi | Mar. 9, 1943 |
| 2,391,152 | Gillon | Dec. 18, 1945 |